United States Patent [19]

Jensen

[11] Patent Number: 5,056,905
[45] Date of Patent: Oct. 15, 1991

[54] CONTROL SYSTEM FOR AUTOMATIC ADJUSTMENT OF THE REARVIEW MIRROR OF A VEHICLE

[75] Inventor: Kaj B. Jensen, Skovbrynet 24, 2. tv., DK-4700 Næstved, Denmark

[73] Assignees: Kaj B. Jensen; Bent Pedersen; Benita B. Jensen; Inge Pedersen, all of Næstved, Denmark; a part interest to each

[21] Appl. No.: 235,878
[22] PCT Filed: Aug. 3, 1987
[86] PCT No.: PCT/DK87/00097
   § 371 Date: Aug. 15, 1988
   § 102(e) Date: Aug. 15, 1988
[87] PCT Pub. No.: WO88/04619
   PCT Pub. Date: Jun. 30, 1988

[30] Foreign Application Priority Data

Dec. 16, 1986 [DK] Denmark .................. 6047/86

[51] Int. Cl.⁵ ............................. G02B 7/18
[52] U.S. Cl. ........................ 359/843; 307/10.1; 359/877
[58] Field of Search ............... 350/600, 605, 606, 633, 350/637; 307/10 R; 340/825.69, 903

[56] References Cited

U.S. PATENT DOCUMENTS 3,469,901 9/1969 Cook et al. .
3,640,609 2/1972 McKee et al. .
3,749,480 7/1973 DeWitt et al. .
4,447,808 5/1984 Marcus .................. 340/825.69
4,609,255 9/1986 McKee et al. .
4,679,158 7/1987 Tate ........................ 250/224
4,694,295 9/1987 Miller et al. ............. 340/903
4,706,086 11/1987 Panizza .................... 340/904

FOREIGN PATENT DOCUMENTS 0094817 11/1983 European Pat. Off. .
3225021 1/1984 Fed. Rep. of Germany .
3527079 1/1986 Fed. Rep. of Germany .
2601634 1/1988 France .................... 350/605
0004243 1/1980 Japan ..................... 350/605
8605451 9/1986 PCT Int'l Appl. .
8500323 4/1986 Sweden .

Primary Examiner—Bruce Y. Arnold
Assistant Examiner—R. D. Shafer
Attorney, Agent, or Firm—Ladas & Parry

[57] ABSTRACT

A control system for automatic adjustment of the rearview mirrors (6) of a vehicle (1) and of the type where the horizontal angular position of the mirror, via airborne signals (8) from transmitter and receiver means (7, 14), is changed by means of a drive unit (5) in response to the mutual horizontal angular position between coupled vehicle parts (2,3), and where transmitter and receiver are positioned on their respective vehicle parts.

7 Claims, 3 Drawing Sheets

CONTROL SYSTEM FOR AUTOMATIC ADJUSTMENT OF THE REARVIEW MIRROR OF A VEHICLE

BACKGROUND OF THE INVENTION

The invention concerns a control system for automatic adjustment of the rearview mirrors of a vehicle and of the type where the horizontal angular position of the mirror via airborne signals from transmitter and receiver means, is changed by means of a drive unit in response to the mutual horizontal angular position between coupled vehicle parts.

For several years the problems concerning the rearview mirror equipment of trucks have been realized since, as is well known, drivers' rearward vision is insufficient in many traffic situations because the size and height of trucks details that, notwithstanding the improvement in the standard equipment of mirrors (with e.g. near view, rearview and wide angle mirrors), there will always be zones in so-called blind angles which cannot be seen from the cab.

Thus, there are many accidents with trucks, in particular during right-hand turns where, as mentioned, a single rearview mirror cannot provide comprehensive all-embracing vision along the side of the truck precisely because of the blind angles.

Apart from proposals for equipping trucks with more mirrors of different types, attention and efforts have for several years been devoted to various, more or less automatic devices for adjusting rearview mirrors. Thus, e.g. the U.S. Pat. No. 3,469,901 and the U.S. Pat. No. 4,609,265 as well as the EP Patent Application 0 094 817 disclose devices utilizing the relative angular displacement between a front and a rear vehicle part. Thus, they are devices which are essentially just used in connection with combinations of trucks and towed vehicle parts such as trailers or semi-trailers collectively referred to as trailers in the following. Since this system is based on changes in the mutual angular position between the motor vehicle and the trailer, it will be appreciated that the system cannot be used for single vehicles.

In a variety of these systems the angular changes at the so-called fifth wheel of the motor vehicle and the trailer is sensed by a cord drive, one of the front corners of the trailer having secured thereto a cord, a cable or the like whose other end, in a predetermined length, is wound onto a drum which rotates in response to the angular displacement of the motor vehicle with respect to the trailer.

Also so-called steering gear responsive systems for automatic adjustment of rearview mirrors are known. In contrast to the above-mentioned ones' such systems may be used for all types of vehicles, but are vitiated by the serious drawback that the mirror adjust itself in direct response to the angular position of the steered wheels away from straight ahead. Such a device may involve serious consequences, e.g. in the situation where the vehicle parts of a truck and trailer combination are aligned and are perhaps stationary with the steering wheels fully turned to one side, causing the actual field of view to be quite different from the one actually required, and resulting in precisely the undesired blind angles which may cause overlooking of other traffic such as cyclists.

Such a principle is disclosed e.g. in the U.S. Pat. No. 3,640,609. This system however has a relatively complex structure and complicated mode of operation and is consequently rather expensive.

A relatively new development is the so-called wireless detection systems where no mechanical means of transfer are used. The Swedish Published Application 447 087 is an example of this. The principle is that a combined transmitter/receiver device on the motor vehicle of a truck and trailer combination detects reflections against an oppositely disposed object (the trailer) these reflections varying with the angular position of the motor vehicle with respect to the trailer. The signals received are then used for controlling the rearview mirror angle.

This system operates satisfactorily as far as it goes, even during backing and other manoeuvring, but has the drawback that the reflections may be affected by other factors than the angle between the two vehicle parts, e.g. dirt on the reflecting face.

The object of the invention is to provide a control system of the present type which is more reliable than the known ones and which makes it possible to adjust rearview mirrors according to the field of view actually required so as to provide optimum manoeuvrability of the vehicle without any risk of blind angles. Another object of the invention is that the mirror adjusting system is to be of such simplicity as to allow ready mounting on a vehicle without unduly great costs.

SUMMARY OF THE INVENTION

A control system according to this invention, for use with a vehicle of the type including a coupled together motor vehicle and trailer, comprises a rearview mirror mounted on the motor vehicle, a drive unit for the mirror, a wireless signal transmitter mounted on the trailer, and a signal receiver mounted on the motor vehicle. In use of the system, the characteristics of the signal reaching the receiver are a function of the mutual angular position between the motor vehicle and the trailer, and, at a preselected mutual angular position therebetween, the drive unit is activated to cause a preselected horizontal angular rotation of the mirror to provide the driver of the motor vehicle with the desired rearward field of view.

Such a system operates reliably independently of exterior conditions. The receiver may e.g. be positioned in the vicinity of the mirror optionally incorporated in it, and the transmitter may be detachably positioned on the rear edge of the trailer so that it may be moved rapidly and in a simple manner from one vehicle to the other, thus providing for the desired flexibility for use on all types of vehicle combinations.

In one embodiment of the invention, that essential parts of the system may also be used when the motor vehicle is used alone, i.e. without any coupled trailer. In that case, the angular position of the mirror is controlled by the steering gear of the motor vehicle.

DESCRIPTION OF THE DRAWING

The invention will be explained fully below with reference to the drawing, in which.

DESCRIPTION OF PREFERRED EMBODIMENTS OF THE INVENTION

Figure 1:
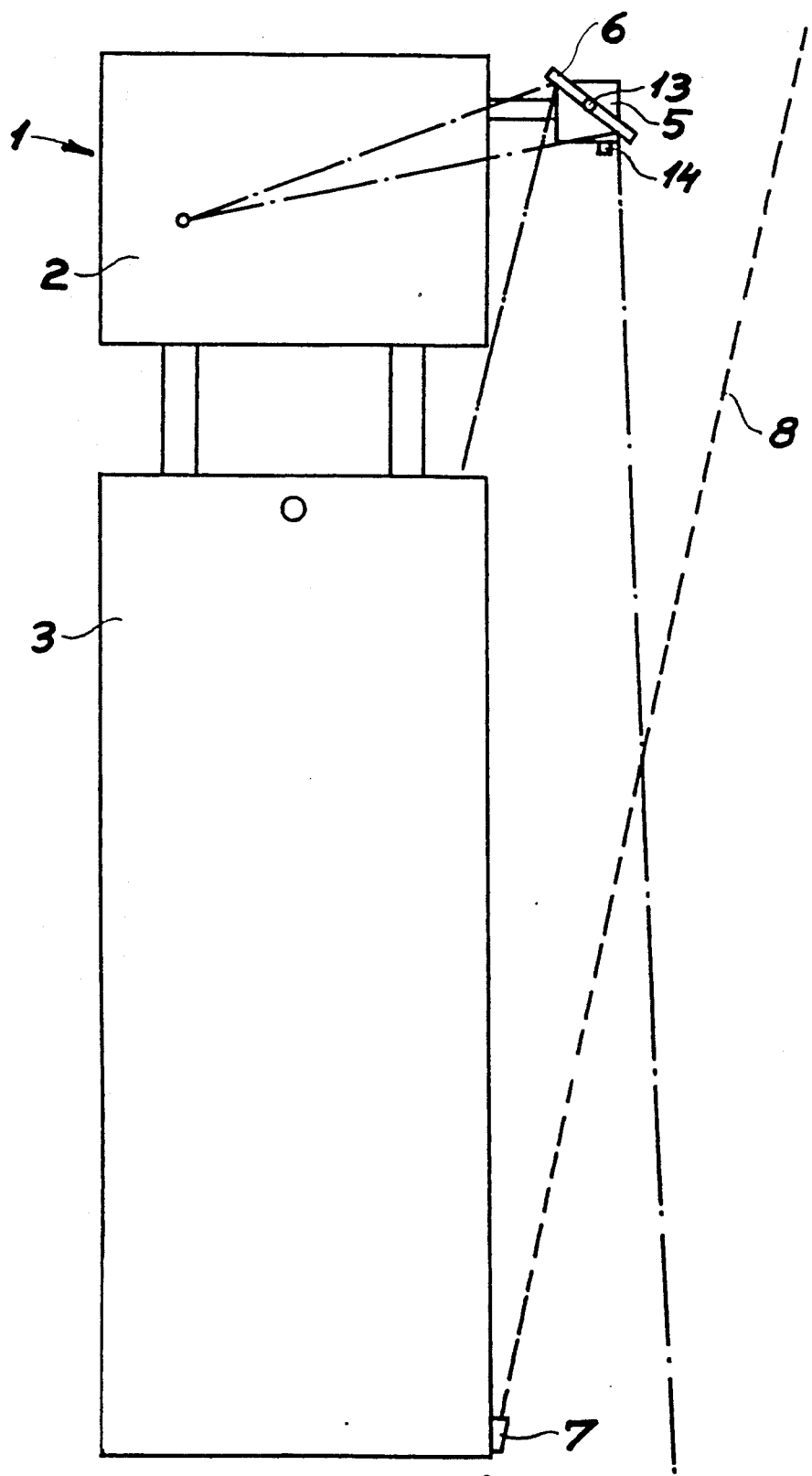
FIG. 1 is a schematic top view of a truck comprising a motor vehicle and a trailer, the two vehicle parts being positioned for straight ahead driving and with the right rearview mirror in its horizontal initial position.

FIG. 1 shows a truck 1 consisting of a motor vehicle 2 and a trailer 3. In the illustrated straight ahead driving, the field of view, shown in dash and dot lines, of the right-hand rearview mirror 6, which is rotatable about a vertical axis 13 essentially follows the right side of the trailer. A broken line 8 indicates a wireless signal from a transmitter 7 positioned at the rear edge of the trailer 3. As shown, the signal 8 passes the mirror 6 without hitting it.

Figure 2:
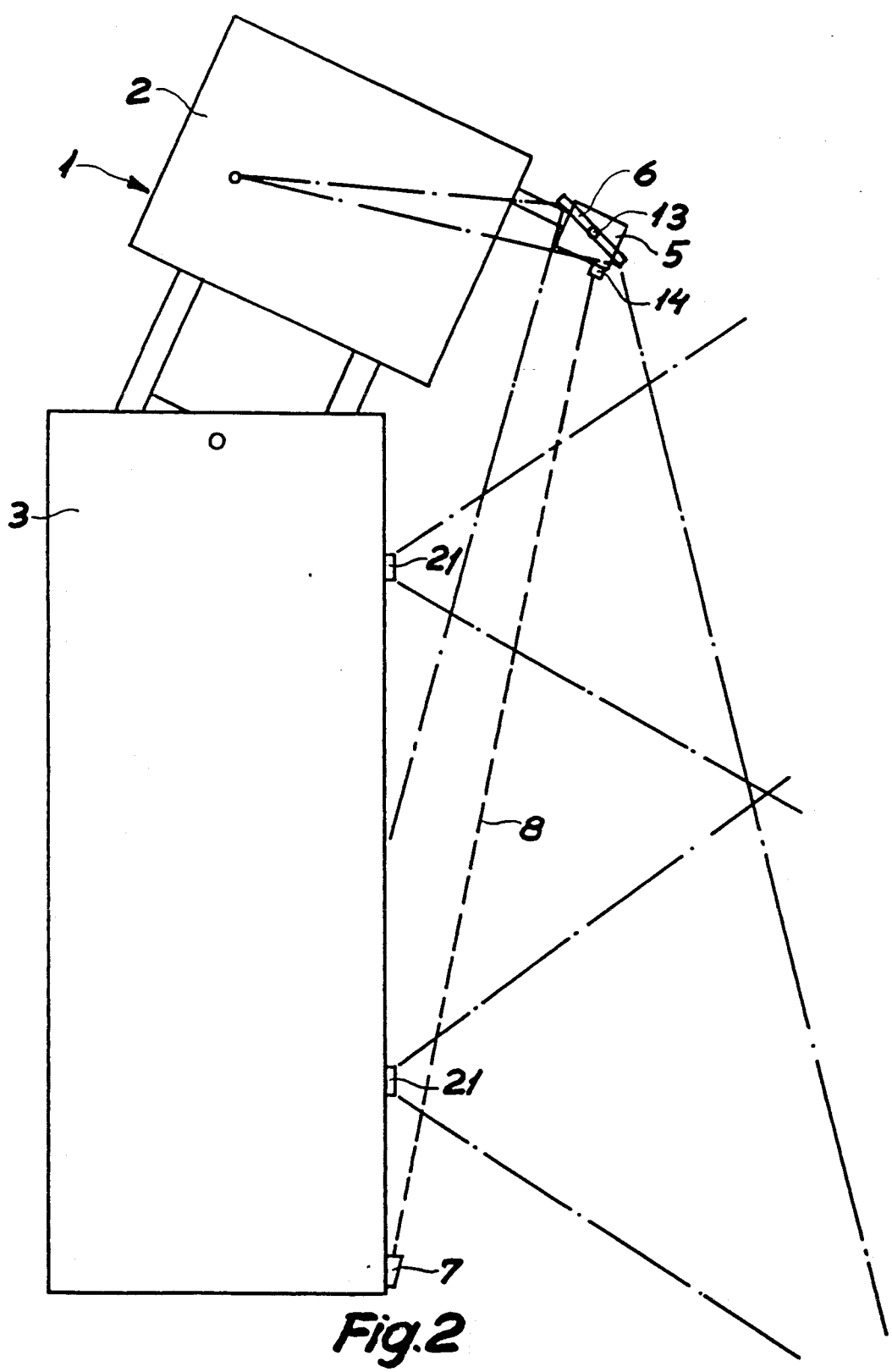
FIG. 2 shows the truck during a right-hand turn with changed angular position of the rearview mirror.
Figure 3:
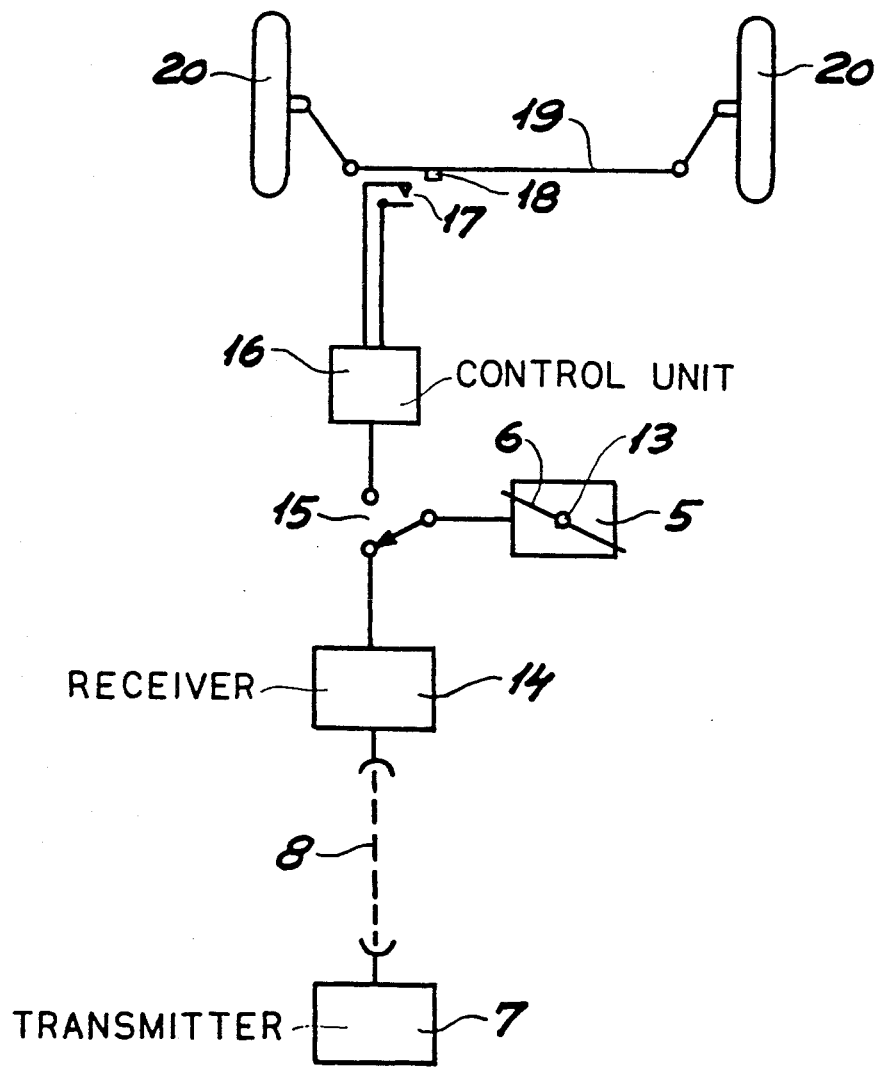
FIG. 3 is a block diagram of the electric control circuits.

When the truck 1 is to negotiate a right-hand turn, as shown in FIG. 2 causing the motor vehicle 2 to be angularly displaced with respect to the trailer 3, the signal beam 8 hits a receiver means 14 mounted on a drive unit 5 for the mirror. As shown in FIG. 3, this receiver means is connected to the drive unit 5 of the mirror through a switch 15 and is adapted to cause the drive unit to rotate the mirror through a predetermined angle about the axis 13 upon reception of the signal 8, causing the field of view to be turned to the position shown in FIG. 2 so that the driver can still see most of the area along and to the rear of the vehicle.

When the signal beam 8 again moves away from the mirror upon realignment of the vehicle, the receiver means 14 causes the drive unit to turn back to the position shown in FIG. 1.

As appears from FIG. 3, when the switch 15 is activated, the drive unit 5 can be connected to a control unit 16, which is actuated by a contact means, e.g. a reed relay 17 when a movable part of the steering gear of the truck has moved a predetermined distance away from neutral. The contact means 17 may e.g. be activated by a magnet 18 which is secured to the connecting rod 19 of the steering gear of the truck to turn the front wheels 20. When the contact 17 is closed, the control unit 16 causes the drive unit 5 to rotate the mirror 6 through a predetermined angle in the same manner as the receiver 14, and when the contact is broken again upon return movement of the steering gear, the mirror is rotated back to the initial position. This arrangement can be used to advantage when the motor vehicle is used as a single vehicle.

In FIG. 2, a pair of lights 21 are shown at the side of the trailer and these lights may be used advantageously in connection with the mirror adjusting system so as to additionally reduce the risk of overlooking of e.g. cyclists.

The details of the control system shown and described can be modified in many ways within the scope of the invention. Thus, it is e.g. feasible in a manner known per se to arrange the transmitter and the receiver so that a receiver means mechanically connected with the mirror automatically tries to adjust itself for reception of maximum signal. In this case, the mirror adjustment will take place continuously.

What is claimed is:

1. A control system for automatic adjustment of a rearview mirror of a vehicle, said system comprising:
    a motor vehicle pivotally coupled at a rearward end thereof to a forward end of a trailer,
    a rearview mirror mounted on a drive unit on a first side of said motor vehicle, a wireless signal transmitter mounted on a corresponding first side of said trailer adjacent to the rearward end of said trailer, and a wireless signal receiver for receiving a signal beam transmitted by said transmitter when mounted on said motor vehicle in preselected spatial relationship with said mirror, a horizontal angular position of said mirror being changed by said drive unit in response to a preselected change in the mutual angular position between said motor vehicle and said trailer, and said mutual angular position change being detected as a variation, said variation being between no signal when said motor vehicle is straight ahead of said trailer wherein said signal beam angularly passes said receiver and a signal received by said receiver from said transmitter when said motor vehicle is turned to said first side of said trailer wherein said signal beam hits said receiver.

2. A system according to claim 1, wherein said receiver is mounted on said drive unit.

3. A system according to claim 1, wherein said receiver is incorporated within said mirror.

4. A system according to claim 1 wherein said transmitter is detachably mounted on said trailer.

5. A system according to claim 1 further including switching means connected to said drive unit whereby said drive unit is activated to cause said angular position of said mirror to change in response to either of two inputs to said witching means, one of said inputs comprising an output signal from said receiver, and the other of said inputs comprising an output signal from a control unit, said motor vehicle including a movable steering mechanism, and said control unit generating said output signal therefrom in response to a preselected movement of said steering mechanism.

6. A system according to claim 1, and further comprising light means mounted on said trailer for a lighting operation in connection with said drive unit.

7. A control system for automatic, turn-responsive adjustment of a rearview mirror of a vehicle, said system comprising:
    a motor vehicle pivotally coupled at a rearward end thereof to a forward end of a trailer,
    a drive unit mounted on a first side of said motor vehicle
    a rearview mirror on said drive unit for adjustment of a horizontal angular position of said rearview mirror by said drive unit;
    a wireless signal transmitter mounted on a corresponding first side of said trailer adjacent to the rearward end of said trailer, said wireless signal transmitter transmitting a signal beam at a horizontal angle from said first side of said trailer toward said forward end of said trailer when so mounted;
    a wireless signal receiver for receiving said signal beam and causing said drive unit to adjust said horizontal angular position of said rearview mirror in response to receiving said signal beam; and
    mounting means for mounting said wireless signal receiver on said first side of said motor vehicle in a position for said wireless signal receiver to receive said signal beam only when said motor vehicle has turned sufficiently toward said first side thereof relative to said trailer.

* * * * *